(12) United States Patent
Riviere

(10) Patent No.: US 11,448,761 B2
(45) Date of Patent: Sep. 20, 2022

(54) DEVICE FOR ACQUIRING DATA ON A TARGET, PLATFORM AND METHOD THEREFOR

(71) Applicant: THALES, Courbevoie (FR)

(72) Inventor: Philippe Riviere, Élancourt (FR)

(73) Assignee: THALES, Courbevoie (FR)

( * ) Notice: Subject to any disclaimer, the term of this patent is extended or adjusted under 35 U.S.C. 154(b) by 546 days.

(21) Appl. No.: 16/500,310

(22) PCT Filed: Apr. 4, 2018

(86) PCT No.: PCT/EP2018/058635
§ 371 (c)(1),
(2) Date: Oct. 2, 2019

(87) PCT Pub. No.: WO2018/185178
PCT Pub. Date: Oct. 11, 2018

(65) Prior Publication Data
US 2020/0191923 A1 Jun. 18, 2020

(30) Foreign Application Priority Data
Apr. 5, 2017 (FR) ..................................... 17 00368

(51) Int. Cl.
*G01S 17/42* (2006.01)
*G01S 7/48* (2006.01)
(Continued)

(52) U.S. Cl.
CPC ............ *G01S 17/42* (2013.01); *G01S 7/4802* (2013.01); *G01S 7/4815* (2013.01);
(Continued)

(58) Field of Classification Search
CPC ...... G01S 17/42; G01S 7/4802; G01S 7/4815; G01S 7/4816; G01S 7/4817; G01S 17/89; G01S 7/4814; G01S 7/4818
See application file for complete search history.

(56) References Cited

U.S. PATENT DOCUMENTS 5,224,109 A 6/1993 Krasutsky et al.
2007/0177841 A1 8/2007 Danziger
(Continued)

OTHER PUBLICATIONS

French Search Report, from the French Patent Office in counterpart French Application No. 1700368, dated Jan. 18, 2018.
(Continued)

*Primary Examiner* — Jared Walker
(74) *Attorney, Agent, or Firm* — ArentFox Schiff LLP

(57) ABSTRACT

The invention relates to a device for acquiring data on a target, said device having an active imaging channel comprising:
a laser source transmitting laser beams having the same angle of divergence and a direction of propagation, the propagation directions all belonging to the same plane and being angularly spaced at the same spacing angle equal to M times the angle of divergence,
a unit for deflection of the laser beams according to M positions, the deflection unit being able to deflect the laser beams in the plane of the divergence angle, and the plurality of positions defining, in the plane, for each laser beam, a continuous angular sector for transmitting the laser beam, and
a detector comprising a plurality of receivers specific to a laser beam.

10 Claims, 5 Drawing Sheets

Figure 1:
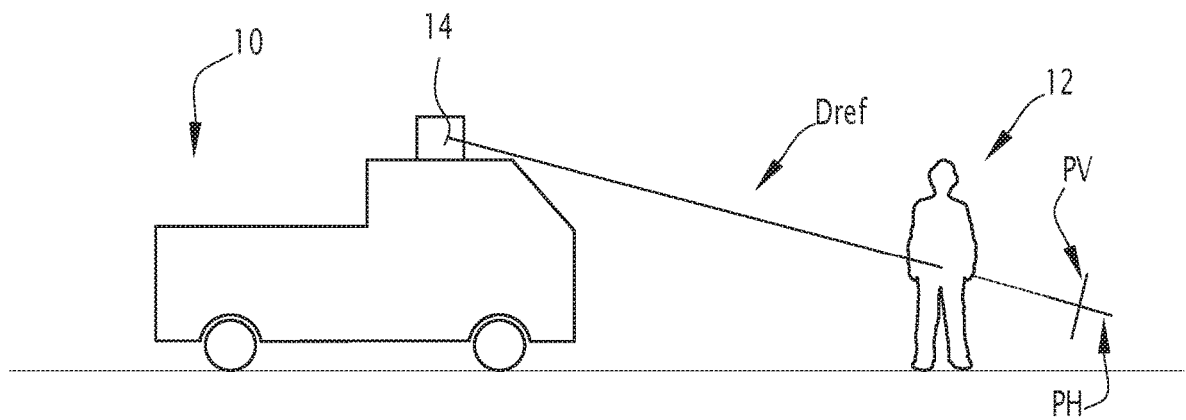

(51) Int. Cl.
*G01S 7/481* (2006.01)
*G01S 17/89* (2020.01)

(52) U.S. Cl.
CPC .......... *G01S 7/4816* (2013.01); *G01S 7/4817* (2013.01); *G01S 17/89* (2013.01)

(56) References Cited

U.S. PATENT DOCUMENTS

| | | |
|---|---|---|
| 2010/0103380 A1* | 4/2010 | Destain .............. G02B 19/0061 362/308 |
| 2013/0107016 A1 | 5/2013 | Federspiel |
| 2013/0128257 A1 | 5/2013 | Stettner et al. |

OTHER PUBLICATIONS

International Search Report and Written Opinion, issued by International Searching Authority in corresponding International Application No. PCT/EP2018/058635, dated Jul. 4, 2018.

* cited by examiner

DEVICE FOR ACQUIRING DATA ON A TARGET, PLATFORM AND METHOD THEREFOR

CROSS-REFERENCE TO RELATED APPLICATIONS

This application is a National Stage Entry of International Patent Application No. PCT/EP2018/058635, filed on Apr. 4, 2018, which claims priority to French Patent Application No. 17 00368, filed on Apr. 5, 2017. The disclosures of the priority applications are incorporated in their entirety herein by reference.

The present invention relates to a device for acquiring data on a target. The present invention also relates to a platform including such a device and a method for acquiring data on a target.

The invention falls within the field of target tracking, in which field operators wish to obtain good precision on the distance from the target with a high refresh rate on the distance information. The precision requirement relates to relatively remote targets, in particular several kilometers away.

To that end, target tracking methods exist called "flash" methods.

During such methods, a flash of laser light is sent toward the target and its environment and received by a detector in order to obtain the position of the target.

However, the distance precision of such a technique is not sufficient.

There is a need for a device for acquiring data on a target providing better distance precision with a high refresh rate of the distance information.

To that end, disclosed is a device for acquiring data on a target, the device comprising an active imaging channel of a target including a transmission part comprising a laser source capable of transmitting a plurality of laser beams, each laser beam having an angle of divergence and a direction of propagation, the angles of divergence having the same value, the directions of propagation all belonging to a same plane and being spaced apart, angularly in the plane, from the direction of propagation closest to the same spacing angle, the ratio between the spacing angle and the value of the angles of divergence being equal to an integer strictly greater than 1 (called M hereinafter), a unit for deflection of the laser beams according to a plurality of positions, the number of positions being equal to the integer (M), the deflection unit being capable of deflecting the laser beams in the plane of an angle of deflection equal to the value of the angle of divergence, the plurality of positions defining, in the plane, for each laser beam, a continuous angular transmission sector specific to the considered laser beam. The active imaging channel includes a reception part comprising a detector including a plurality of receivers, each receiver being specific to a laser beam, each receiver being arranged to receive the specific laser beam reflected by the target in each of the positions of the specific laser beam and to obtain reception information of the specific laser beam, a calculator suitable for deducing the position of the target from reception information.

According to specific embodiments, the data acquisition device comprises one or more of the following features, considered alone or according to any technically possible combinations:

each receiver includes an input face having an angular extension in the plane whose value is equal to the value of the spacing angle.

each receiver includes an input face having a center, the centers of the receivers being distributed in a first row and a second row, the second row being parallel to the first row and being separate from the first row, the input face of a receiver whose center is part of the first row being in contact with the input face of a receiver whose center is part of the second row.

each laser beam has a wavelength, the laser source being capable of transmitting the laser beam in two distinct wavelengths.

the calculator is also capable of deducing reflectivity information of the target from reception information.

the device further includes a passive imaging channel of a target in order to obtain images of the target, the calculator also deducing the position of the target from images of the target.

the laser source includes a laser capable of generating laser light including the laser beams and optical fibers capable of propagating laser light, each optical fiber being specific to a laser beam and being equipped with a laser beam shaping collimator.

each receiver is a fibrous photodiode.

The present disclosure also relates to a platform including a device for acquiring data on a target as previously described.

The present disclosure also relates to a method for acquiring data on a target using a data acquisition device comprising a calculator and an active imaging channel of a target including a laser source, a deflection unit and a detector, the method comprising at least one step for transmitting a plurality of laser beams by the laser source capable of transmitting a plurality of laser beams, each laser beam having an angle of divergence and an angle of propagation, the angles of divergence having the same value, the directions of propagation all belonging to the same plane and being spaced apart, angularly in the plane, from the direction of propagation closest to the same spacing angle, the ratio between the spacing angle and the value of the angles of divergence being equal to an integer strictly greater than 1 (M), for deflecting laser beams in the plane of an angle of deflection equal to the value of the angle of divergence by a deflection unit of the laser beams, the deflection step being implemented several times, in order to obtain an integer number of positions (M) defining, in the plane, for each laser beam, a continuous angular transmission sector specific to the considered laser beam, for reception of laser beams in each of the positions by detector including a plurality of receivers, each receiver being specific to a laser beam, each receiver being arranged to receive the specific laser beam reflected by the target in each of the positions of the specific laser beam and to obtain reception information of the specific laser beam, and for the calculator to deduce the position of the target from reception information.

Figure 2:
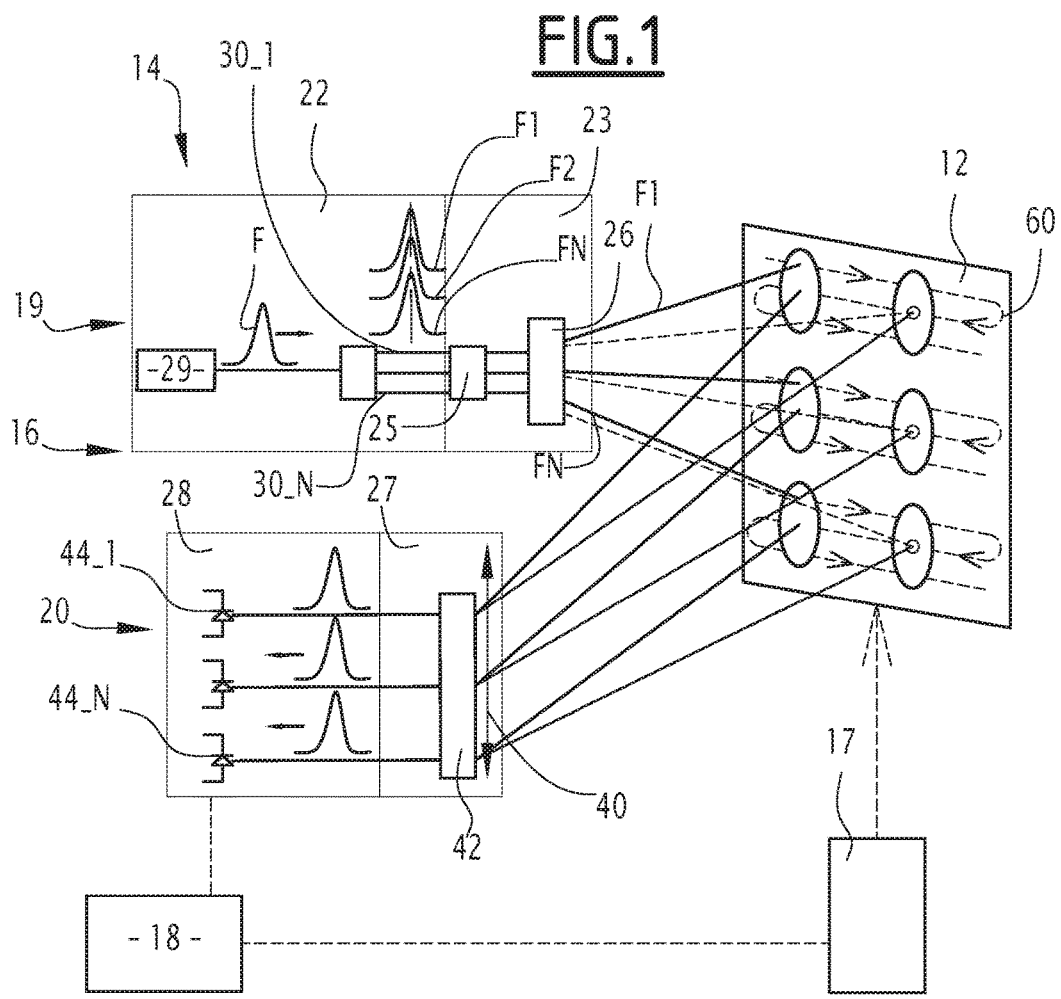
Figure 3:
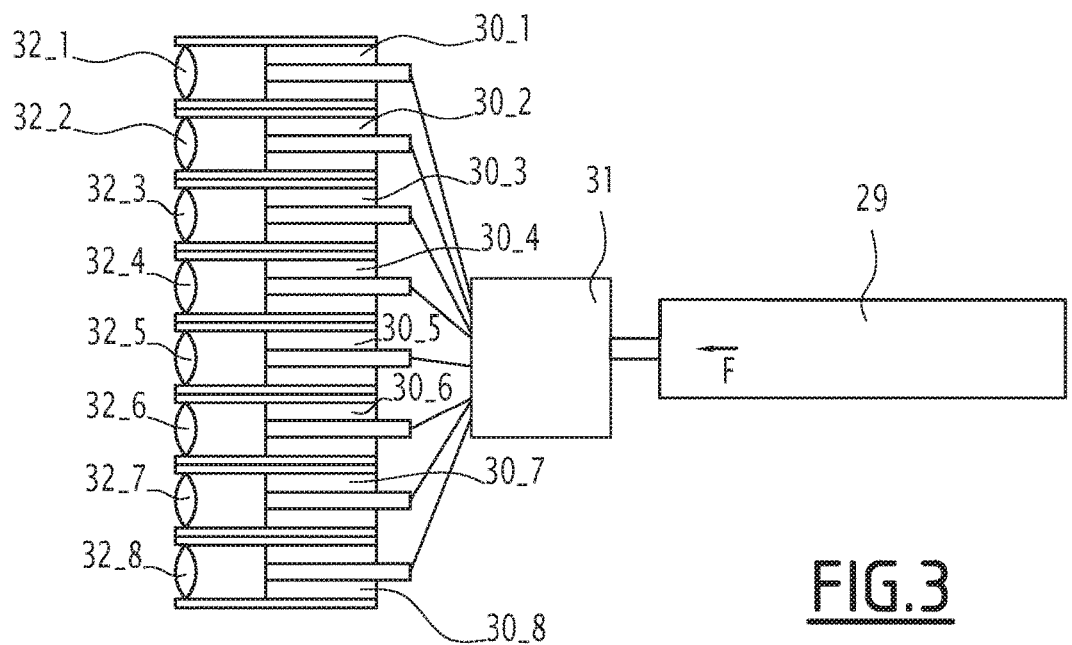
Figure 4:
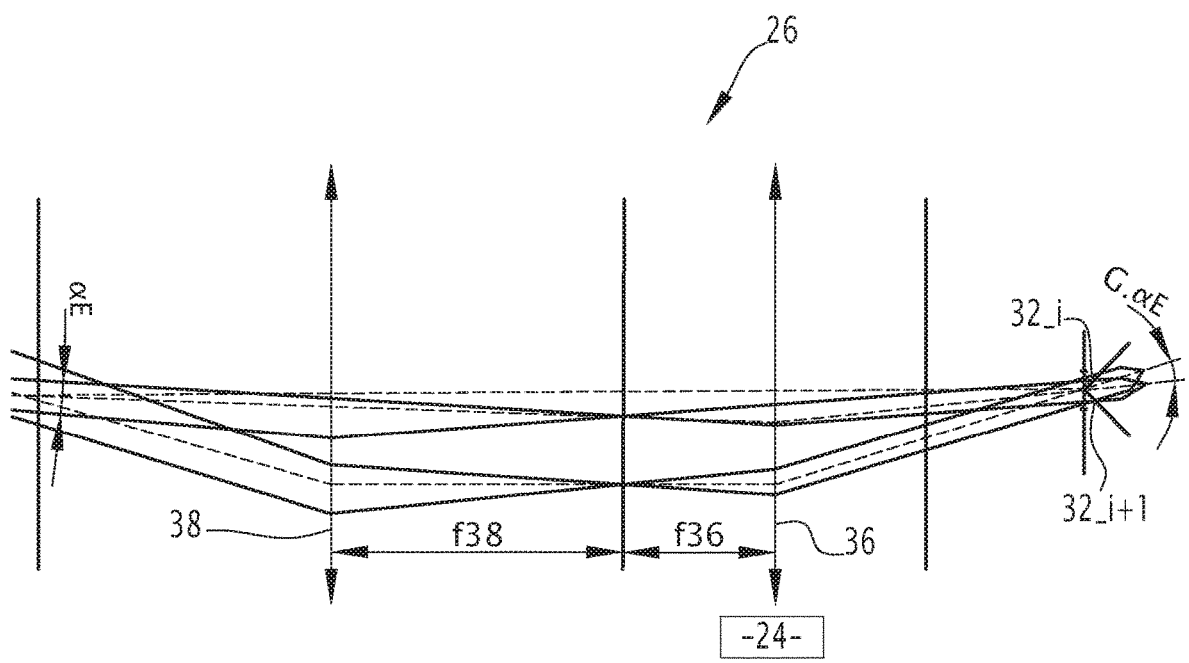
Figure 5:
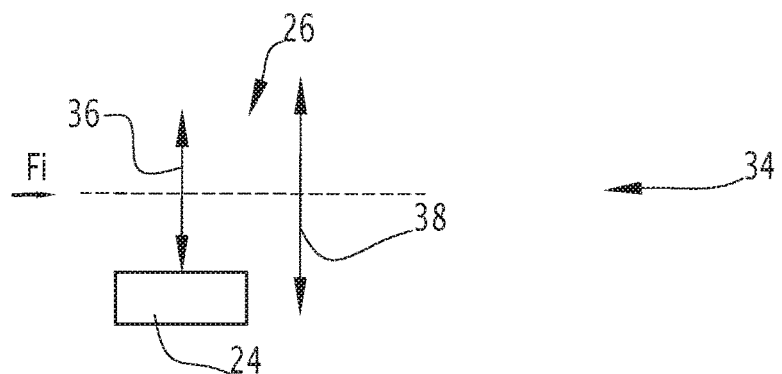
Figure 6:
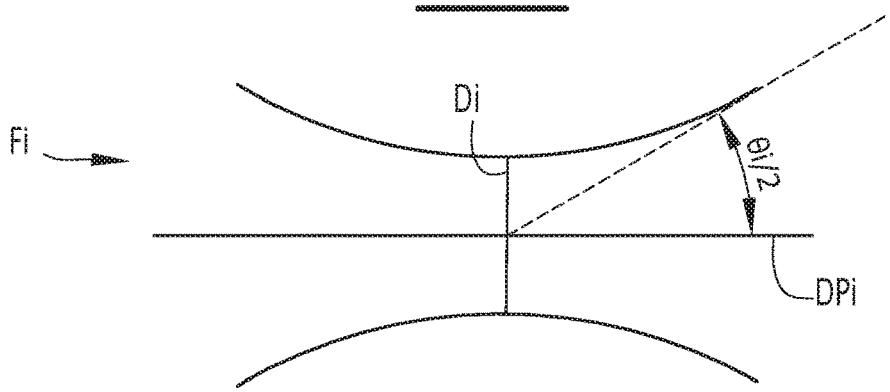
Figure 7:
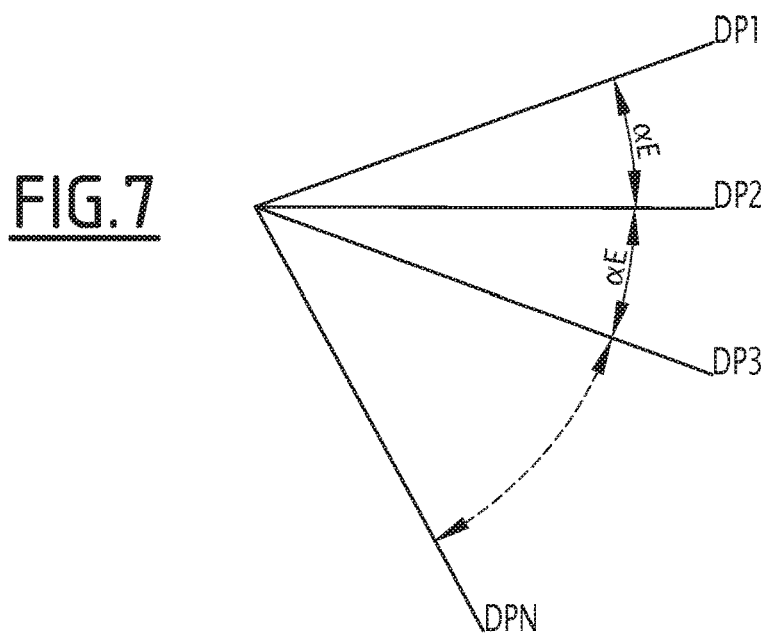
Figure 8:
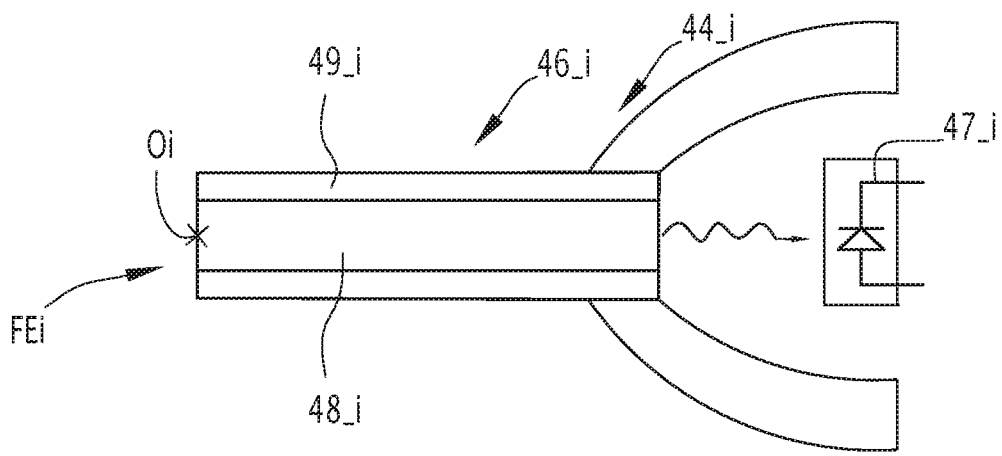
Figure 9:
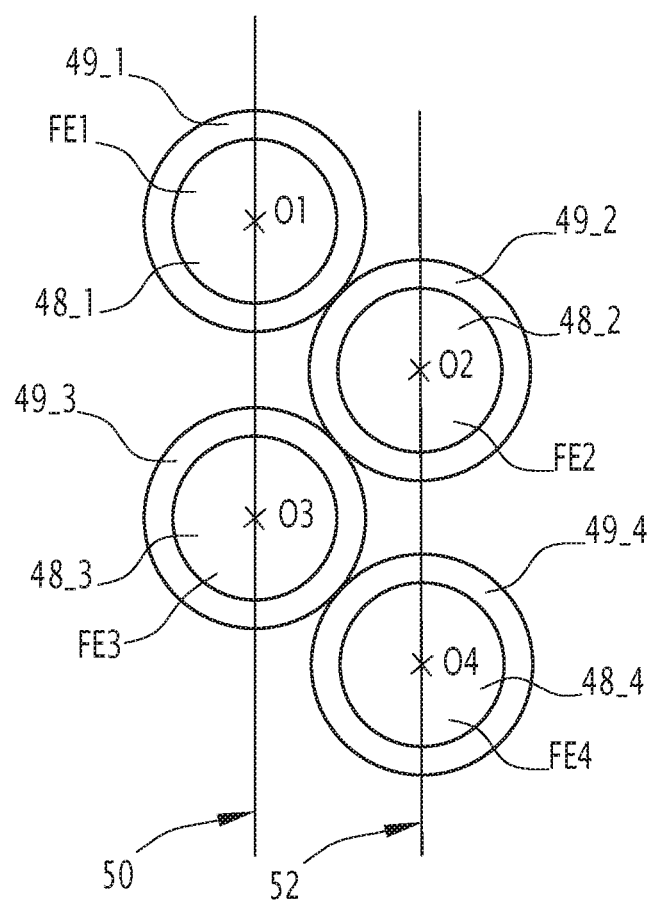

Other features and advantages of the invention will appear upon reading the following description of embodiments of the invention, solely as an example and done in reference to the drawings, which are:

FIG. 1, a schematic view of a platform and a target, the platform being provided with an exemplary data acquisition device, FIG. 2, a schematic view of the data acquisition device and the target including a laser source capable of transmitting a plurality of laser beams, a device for deflecting the laser beams, receivers, a calculator and passive imaging, FIG. 3, a schematic view of the laser source of the data acquisition device, FIG. 4, a view illustrating the journey of the laser beams passing through the afocal and the deflection unit in elevation, FIG. 5, a schematic view of the deflection device in elevation of the laser beams in the plane, FIG. 6, a schematic view of a laser beam, FIG. 7, a schematic illustration of the arrangement of the laser beams, FIG. 8, a schematic view of a receiver, and FIG. 9, a schematic front view of the plurality of receivers.

A platform 10 and a cable 12 are shown in FIG. 1.

According to the example of FIG. 1, the platform 10 is a land vehicle.

In a variant, the platform 10 is a naval platform.

In each case, a reference direction Dref is defined corresponding to the direction passing through the data acquisition device 14 and moving toward the target 12.

The plane perpendicular to the reference direction Dref corresponds to a vertical plane denoted PV hereinafter.

In contrast, a plane perpendicular to a vertical plane PV is a horizontal plane PH.

A direction of view is also defined for a point of the target 12, the direction of view connecting a target point 12 to the data acquisition device 14.

The angle between the direction of view and the reference direction Dref in a horizontal plane PH is called azimuth.

The angle between the direction of view and the horizontal plane PH is called elevation angle.

By extension, the angular deflection of a laser beam in a horizontal plane PH is referred to hereinafter as azimuth deflection, while the angular deflection of a laser beam in a vertical plane PV is called elevation deflection.

According to the illustrated example, the target 12 is a person.

More generally, the target 12 is a targeted object for which a plurality of points of interest are defined.

Typically, for a person, the head or legs are points of interest.

The target 12 is at a relatively large distance from the platform 10.

For example, the distance between the target 12 and the platform 10 is around 6 kilometers.

The platform 10 includes a device 14 for acquiring data on the target 12.

The device 14 is thus capable of acquiring data relative to the target 12, or more specifically relative to the points of interest defined for the target 12.

In particular, the device 14 is capable of defining the position of the target 12.

The position of the target 12 is understood in the proposed context as the set of distances for each of the potential points of interest. "Potential points of interest" refers to a point in space for which it is likely that a point of interest of the target 12 is located.

The number of potential points of interest and the spatial distribution of the potential points of interest are chosen to allow an identification of the target 12 in light of the uncertainty with which the target 12 is targeted. In our example, an image of 100 azimuth points and 56 elevation points is considered. These values make it possible, in our example, to identify a person in his environment.

The device 14 is also capable of obtaining other information on the target 12, such as the reflection properties of the points of interest of the target 12.

For example, the device 14 is capable of obtaining reflectivity information for the points of interest of the target 12.

The expression "an element capable of doing something" in this context may refer to "an element suitable for doing something", "an element adapted to do something", "an element configured to do something" or "an element doing something".

The fact that one point of interest appears to be glossier than another point of interest is considered reflectivity information in this context.

The device 14 is also capable of detecting, by postprocessing, the target 12 in a complex environment or when the target 12 is partially hidden.

The device 14 is further capable of obtaining such information at a pace greater than 30 Hz.

As shown in FIG. 2, the device 14 includes an active imaging channel 16, a passive imaging channel 17 and a calculator 18.

The active imaging channel 16 is an active imaging channel of the target 12.

The term "active" means that the imaging channel illuminates the target 12 by transmitting light and is capable of obtaining images of the target 12 by collecting light returned by the target 12 or the environment of the target 12.

The active imaging channel 16 includes a transmission part 19 and a reception part 20.

As shown in FIGS. 2 to 5, the transmission part 19 includes a laser source 22, an opto-deflecting unit 23 including an azimuth deflection unit 25 and an afocal 26 including an elevation deflection unit 24. FIG. 2 also illustrates the reception part 20 including a second azimuth deflection unit 27 and a detector 28.

The transmission part 19 will now be described.

The laser source 22 is capable of transmitting a plurality of laser beams.

The laser beams are identified by reference signs Fi, where i is an index from 1 to N, N being an integer identifying the number of laser beams.

N is an integer greater than or equal to 2.

Preferably, the number N is greater than or equal to 4.

According to the proposed example, the number N is equal to 8, as shown in FIG. 3.

In this example, the laser source 22 includes a laser 29 and eight optical fibers 30_1 to 30_N.

The laser 29 is able to generate laser light including the laser beams F1 to FN. The corresponding laser light forms a single beam denoted F in FIG. 3.

The laser 29 is for example a fibrous laser including a main fiber.

For example, the main fiber of the laser 29 is adapted to the wavelength of the laser. In the example, the fiber is made from silica.

The main fiber of the laser 29 supplying the beam F is separated into eight optical fibers 30_1 to 30_N, as illustrated schematically in FIG. 3 with the element whose reference sign is 31.

Each optical fiber 30_i is capable of propagating laser light. Each optical fiber 30_i is specific to a laser beam Fi.

In the proposed example, each optical fiber 30_i is equipped with a collimator 32_i for laser beam shaping.

The laser source 22, that is to say, the set of elements belonging to the laser source 22, is arranged so that the position of the laser beams F1 to FN is specific in space.

Before describing the specific position of the laser beams F1 to FN, general information on the laser beams F1 to FN should be described in reference to the diagram of FIG. 6.

Each laser beam Fi has a wavelength denoted Ai.

In the proposed example, the wavelengths belong to the near infrared domain.

For example, it is assumed that each laser beam Fi is at a wavelength of 1.5 μm.

Each laser beam Fi has an angle of divergence θi and a direction of propagation denoted DPi.

Indeed, each laser beam Fi has a spatial distribution in the divergence θi that is substantially Gaussian. The diameter of the beam at the neck is indicated in FIG. 6 by reference sign Di.

In the described example, the angles of divergence 91 to ON of each laser beam F1 to FN all have the same value θ.

Furthermore, as shown in FIG. 7, the directions of propagation DP1 to DPN of each laser beam F1 to FN all belong to a same plane P.

In the case of FIG. 2, the plane P is a vertical plane PV.

The directions of propagation DP1 to DPN are evenly angularly spaced apart in the plane P. This means that a direction of propagation DP1 to DPN is spaced apart in the closest direction of propagation DP1 to DPN by a same spacing angle αE.

In FIG. 7, the first direction of propagation DP1 is spaced by a spacing angle αE (in the elevation direction) from the second direction of propagation DP2 while the third direction of propagation DP3 is spaced by a spacing angle αE (in the elevation direction) from the second direction of propagation DP2.

The ratio between the spacing angle αE and the value of the angles of divergence θ is equal to an integer M strictly greater than 1. This mathematically means that:

$$\frac{\alpha E}{\theta 1} = \frac{\alpha E}{\theta 2} = \ldots = \frac{\alpha E}{\theta i} = \ldots = \frac{\alpha E}{\theta N} = \frac{\alpha E}{\theta} = M$$

Preferably, the integer M is strictly greater than 4.

For example, in the described embodiment, the integer M is equal to 7.

The laser source 22 is arranged so that the position of the laser beams F1 to FN is a position verifying the preceding conditions.

In the described example, in order to obtain such a specific position, the optical fibers 30_i are monomodal in order to keep the beam quality transmitted by the laser 29.

The laser source 22 thus makes it possible to obtain a plurality of laser beams F1 to FN arranged in the specific position illustrated in FIG. 7.

The elevation deflection unit 24, the azimuth deflection unit 25 and the afocal 26 serve to bring the plurality of laser beams F1 to FN transmitted toward the target into position in a controlled manner.

The elevation deflection unit 24 of the laser beams F1 to FN is able to deflect the laser beams according to a plurality of positions P1 to PM.

The number of positions P1 to PM is equal to the integer M.

The elevation deflection unit 24 is able to deflect the laser beams F1 to FN in the plane P by a deflection angle equal to the value of the divergence angle θ.

The elevation deflection unit 24 is also a hopping deflection unit.

More specifically, assuming that the position P1 is an extreme reference position, the elevation deflection unit 24 is capable of deflecting each laser beam F1 to FN by a deflection angle θ from the first position to place each of these laser beams F1 to FN in the second position P2. The deflection unit 24 is also capable of deflecting each laser beam F1 to FN by a deflection angle 2*θ from the first position to place each of these laser beams F1 to FN in the third position P3. The deflection unit 24 is additionally capable of deflecting each laser beam F1 to FN by a deflection angle (N−1)*θ from the first position P1 to place each of these laser beams F1 to FN in the last position PN.

More generally, the elevation deflection unit 24 is also capable of deflecting each laser beam F1 to FN by a deflection angle (i−1)*θ from the first position to place each of these laser beams F1 to FN in the i-th position Pi.

As a result, the plurality of positions P1 to PM defines, in the plane P, for each laser beam F1 to FN, a continuous angular transmission sector S1 to SN specific to the considered laser beam F1 to FN.

The azimuth deviation unit 25 is a deviation unit of the laser beams F1 to FN in azimuth.

According to the described example, the azimuth deviation unit 25 is a mirror.

As shown in FIG. 4, the afocal 26 has a magnification G.

The afocal 26 includes, according to the example of FIG. 5, a first lens 36 carried by the elevation deflection unit 24 and a second lens 38 spaced apart by a distance equal to the sum of the first focal distance f1 of the first lens 36 and the second focal distance f2 of the second lens 38.

The magnification G is equal to the ratio of the first focal distance f38 to the second focal distance f36.

The magnification G is for example greater than 10.

A laser beam Fi then has, in the object space (at the output of the afocal 26), an angular divergence equal to θ/G.

Typically, the divergence of each laser beam Fi is between 50 microradians (μrad) and 100 μrad. For example, the angular span is equal to 70 μrad.

It should be noted that, in the example, the optical fibers 30_i are arranged along an arc of circle with a suitable spacing, the angular spacing being equal to G times the spacing angle αE.

Furthermore, as shown schematically in FIG. 5, the deflection unit 24 is able to cause a movement of the first lens 36.

The transmission part 19 is thus able to illuminate potential points of interest of the target 12 with sweeping in the azimuth and elevation directions using eight laser beams F1 to FN.

The laser beams are then reflected by the potential points of interest of the target 12 toward the reception part 20, which receives the reflected laser beams.

As previously explained, the reception part 20 includes a second azimuth deflection unit 27 and a detector 28.

The second azimuth deflection unit 27 includes a collection lens 40 and a deviating mirror 42.

The collection lens 40 makes it possible to collect all of the laser beams reflected toward the deviating mirror 42.

The deviating mirror 42 is an azimuth deviating mirror.

The deviating mirror 42 and the azimuth deviating unit 25 are synchronized.

The detector 28 comprises a plurality of receivers 44_1 to 44_N.

Each receiver 44_i is specific to a laser beam Fi.

This means that the detector 28 comprises N receivers 44_1, . . . , 44_N.

Each receiver 44_i is arranged to receive the specific laser beam Fi reflected by the target 12 in each of the positions P1 to PM of the specific laser beam Fi.

Each receiver 44_i makes it possible to obtain reception information from the specific laser beam Fi.

The reception information in particular comprises the reception start time of the laser beam Fi or the amplitude of the reflected laser beam Fi.

According to the described example, each receiver 44_i is a fibrous photodiode visible more specifically in FIG. 8.

Each receiver 44_i comprises an optical fiber 46_i and a photodiode 47_i.

Each optical fiber 46_i makes it possible to define an input face Fei having an angular extension.

The angular extension of each receiver 44_i has a value equal to the value of the spacing angle αE.

Each input face Fei has a center Oi.

Each optical fiber 46_i of each receiver 44_i is multimodal.

Each optical fiber 46_i of each receiver 44_i comprises a core 48_i and a sheath 49_i.

The core 48_i is for example made from silica.

The diameter of the core 48_i has a size on the order of 100 m.

The diameter of the sheath 49_i has a size of between 125 m and 150 m.

The photodiode 47_i is, for example, an avalanche photodiode.

As shown in FIG. 9, the receivers 44_i are arranged according to a configuration in staggered rows.

The centers Oi of the receivers 44_i are distributed in a first row 50 and a second row 52.

The second row 52 is parallel to the first row 50. The second row 52 is separate from the first row 50.

The input face Fei of a receiver 44_i whose center Oi belongs to the first row 50 is in contact with the input face FEi of a receiver 44_i whose center Oi is part of the second row 52.

More specifically, in FIG. 9, the input faces FE1, FE2, FE3 and FE4 of four receivers 44_1, 44_2, 44_3 and 44_4 are shown. The centers O1 and O3 of the first and third receivers 44_1 and 44_3 are aligned along the first row 50 while the centers O2 and O4 of the second and fourth receivers 44_2 and 44_4 are aligned along the second row 52.

Furthermore, the sheath 49_2 of the second receiver 44_2 is in contact on the one hand with the sheath 49_1 of the first receiver 44_1 and on the other hand with the sheath 49_3 of the third receiver 44_3 while the sheath 49_3 of the third receiver 44_3 is in contact on the one hand with the sheath 49_2 of the second receiver 44_2 and on the other hand with the sheath 49_4 of the fourth receiver 44_4.

The reception part 20 is thus capable of obtaining reception information from the laser beams reflected on the target 12.

The passive imaging channel 17 is a passive imaging channel of the target 12, that is to say, an imaging channel capable of obtaining images of the target 12.

The term "passive" means that the imaging channel does not eliminate the target 12 by transmitting light and is capable of obtaining images of the target 12 by collecting formal radiation coming from the target 12 or the environment of the target 12.

According to the described example, the passive imaging channel 17 is a camera.

The camera is, for example, sensitive to the photons comprised in the band from 3 micrometers (μm) to 5 μm.

The calculator 18 is capable of deducing the position of the target 12 from reception information.

The calculator 18 is also capable of deducing reflectivity information of the target 12 from reception information.

The calculator 18 is additionally capable of deducing the position of the target 12 also from images of the target 12 obtained using the passive imaging channel 17.

Figure 10:
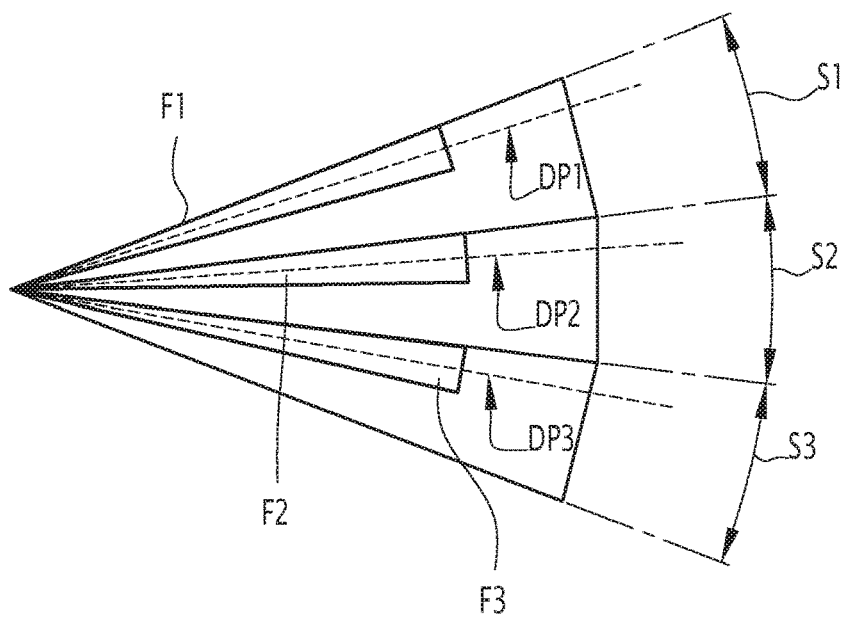
Figure 11:
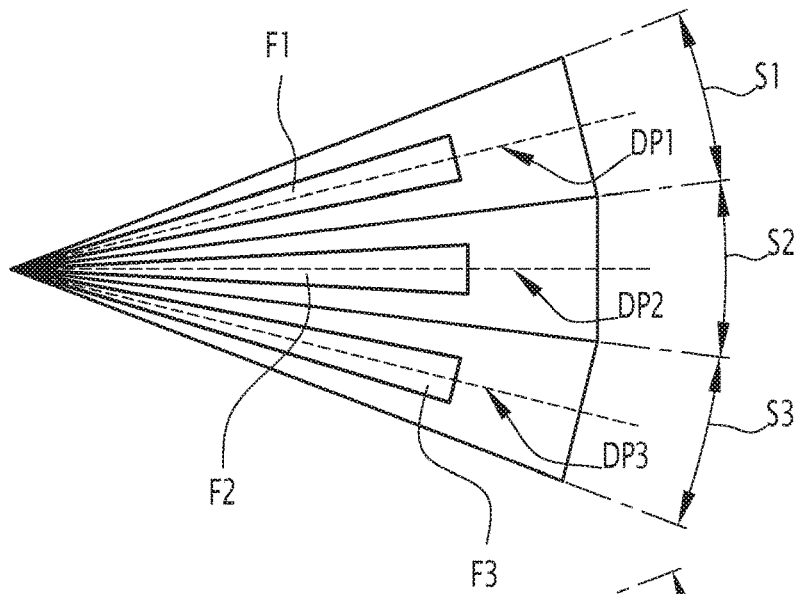
Figure 12:
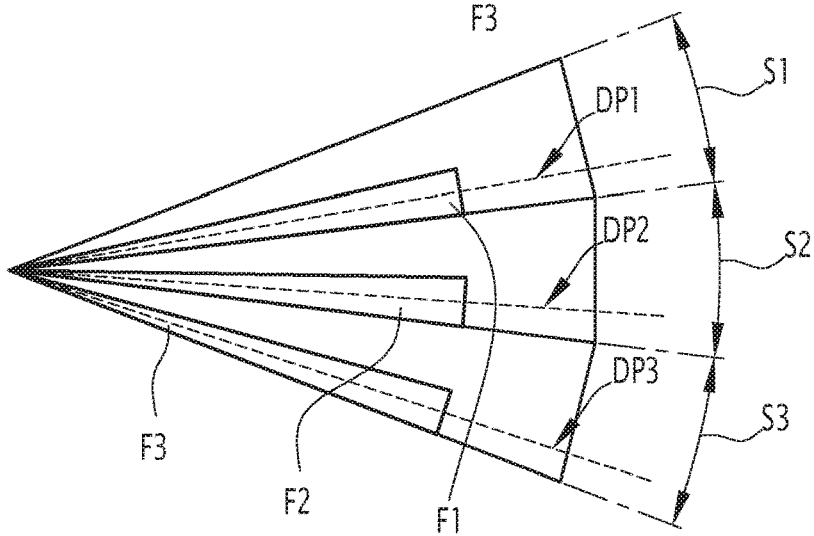

The operation of the device 14 is now described in reference to FIGS. 10 to 12 and an example embodiment of a method for acquiring data on the target 12.

The acquisition method comprises a plurality of steps implemented several times, the plurality of steps comprising a transmission step, a deflection step, a reception step and a deduction step.

During the transmission step, the laser source 22 transmits the plurality of laser beams F1 to FN in one of the specific positions described in reference to FIG. 7.

During the reception step, the laser beams F1 to FN reflected by the target 12 are received by the specific receiver 44_i. Each receiver 44_i then behaves as a flow collector.

This makes it possible to obtain reception information from the specific laser beam F1 to FN.

During the deflection step, the deflection unit 24 deflects the laser beams F1 to FN in the plane P by a deflection angle equal to the value of the divergence angle θ to go from one position to another position.

During the deduction step, the calculator 18 deduces the position of the target 12 from reception information using a time of flight technique. More specifically, the time elapsed between the transmission of a laser beam and the reception of the reflected laser beam is proportional to the distance between the target 12 and the data acquisition device 14.

As an example and in reference to FIGS. 10 to 12, it is assumed that the scanning of the potential points of interest of the target 12 is implemented by constant azimuth lines, the azimuth being modified using the azimuth deviation unit 25, for each azimuth line, the elevation deflection unit 24 deflects the laser beams F1 to FN according to one of the positions P1 to PM.

To simplify, a case with three beams has been illustrated for FIGS. 10 to 12 for a given azimuth.

In FIG. 10, each of the three beams F1, F2 and F3 is in the first position P1; in FIG. 11, each of the three beams F1, F2 and F3 is in the second position P2 and in FIG. 12, each of the three beams F1, F2 and F3 is in the second position P3. The passage from one position to another is done using the deflection unit 24.

It appears that, for the first beam F1, the passage in the three positions P1, P2 and P3 makes it possible to sweep the entire first angular sector S1 in elevation. The same remark is valid for the second beam F2 with respect to the second angular sector S2 and for the third beam F3 with respect to the third angular sector S3.

The three angular sectors S1, S2 and S3 being continuous in elevation, a relatively fast sweeping is done in elevation.

The expression "fast" is to be understood in comparison with a device 14 that performs a point-by-point sweep. In the illustrated case, it would be necessary to perform 9 deflections in elevation, whereas 3 suffice in the described case. This represents a gain by a factor M that is equal to 3 in the proposed case. The advantage is even more pronounced when the number of lines in elevation is high.

As illustrated by the arrows 60 on the target 12 in FIG. 2, the sweeping is implemented by azimuth lines with constant elevation, the elevation being modified using the elevation deflection unit 24 once an azimuth line has been completed.

In a variant, the sweeping can be implemented using columns in elevation with constant azimuth, the azimuth being modified using a deflection unit in azimuth once a column in elevation has been completed.

In such a variant, the gain in number of deflections previously explained is also valid in this case.

The gain in number of deflections makes it possible to obtain position information of the target 12 and reflectance of the target 12 in order to identify the target 12 at a greater pace (M times faster) while obtaining a centimetric measurement of the target 12—platform 10 distance for each point of interest of the target 12.

In other words, the device 14 makes it possible to obtain multiplexing of the transmission and reception channels making it possible to obtain a high active imaging pace.

The range of the device 14 is great, several kilometers. The device 14 further makes it possible to cover a relatively large field. As an example, by using the number of points defined below, the device 14 makes it possible to cover about 4 by 7 milliradians.

As an illustration, for such a field, assuming that the number of potential points of interest is 5600 with M=7 and N=8, the device 14 is capable of obtaining a maximum refresh pace of the information of 143 Hz at 1500 meters or 35 Hz at 6000 meters.

The device for acquiring data 14 therefore has better distance precision with a high refresh rate of the distance information.

According to one particular example, the device 14 is used to obtain a centimetric precision of the distance of a target located outside the axis of the viewed direction to make it possible to time the time of flight of a munition.

Other embodiments can be considered for the device 14.

According to another embodiment, the laser source 29 comprises two lasers transmitting in two different wavelengths. In this case, the laser beams F1 to FN can be connected to one or the other laser via an optical switch. In this case, the receiving photodiodes are compatible with the considered wavelengths.

For example, the first laser is at a first wavelength of 1.06 µm, while the second laser is at a second wavelength of 1.55 µm. The receiving photodiodes are made from InGaAs. This makes it possible to allow the user of the device 14 to benefit from a choice in the operating wavelength of the transmitting part 19.

The present invention also covers all technically possible combinations of the embodiments that have been described in the preceding description.

The invention claimed is:

1. A device for acquiring data on a target, the device comprising:
    an active imaging channel comprising:
        a transmission part including:
            a laser source capable of transmitting a plurality of laser beams, each laser beam having an angle of divergence and a direction of propagation, the angles of divergence having the same value, the directions of propagation all belonging to a same plane and being spaced apart, angularly in the plane, from the closest direction of propagation by the same spacing angle, the ratio between the spacing angle and the value of the angles of divergence being equal to an integer strictly greater than 1,
            a unit for deflection of the laser beams according to a plurality of positions, the number of positions being equal to the integer, the deflection unit being capable of deflecting the laser beams in the plane of an angle of deflection equal to the value of the angle of divergence, the plurality of positions defining, in the plane, for each laser beam, a continuous angular transmission sector specific to the considered laser beam, and
        a reception part including:
            a detector including a plurality of receives, each receiver being specific to a laser beam, each receiver being arranged to receive the specific laser beam reflected by the target in each of the positions of the specific laser beam and to obtain reception information of the specific laser beam,
    a calculator suitable for deducing the position of the target from reception information.

2. The device according to claim 1, wherein each receiver includes an input face having an angular extension in the plane whose value is equal to the value of the spacing angle.

3. The device according to claim 1, wherein each receiver includes an input face having a center, the centers of the receivers being distributed in a first row and a second row, the second row being parallel to the first row and being separate from the first row, the input face of a receiver whose center is part of the first row being in contact with the input face of a receiver whose center is part of the second row.

4. The device according to claim 1, wherein each laser beam has a wavelength, the laser source being capable of transmitting the laser beam in two distinct wavelengths.

5. The device according to claim 1, wherein the calculator is also capable of deducing reflectivity information of the target from reception information.

6. The device according to claim 1, wherein the device further includes a passive imaging channel of a target in order to obtain images of the target, the calculator also deducing the position of the target from images of the target.

7. The device according to claim 1, wherein the laser source includes a laser capable of generating laser light including the laser beams and optical fibers capable of propagating laser light, each optical fiber being specific to a laser beam and being equipped with a laser beam shaping collimator.

8. The device according to claim 1, wherein each receiver is a fibrous photodiode.

9. A platform comprising a device for acquiring data on a target according to claim 1.

10. A method for acquiring data on a target using a data acquisition device comprising a calculator and an active imaging channel comprising a laser source, a deflection unit and a detector, the method comprising at least the following step:
    transmitting a plurality of laser beams by the laser source capable of transmitting a plurality of laser beams, each laser beam having an angle of divergence and a direction of propagation, the angles of divergence having the same value, the directions of propagation all belonging to a same plane and being spaced apart, angularly in the plane, from the closest direction of propagation by the same spacing angle, the ratio between the spacing angle and the value of the angles divergence being equal to an integer strictly greater than 1,
    deflecting the laser beams in a plane by an angle of deflection equal to the value of the angle of divergence by a deflection unit of the unit laser beams, the deflection step being implemented several times, to obtain an integer number of positions defining, in the plane for each laser beam, a continuous angular transmission sector specific to the considered laser beam,
    receiving laser beams in each of the positions by the detector including a plurality of receivers, each receiver being specific to a laser beam, each receiver being arranged to receive the specific laser beam reflected by the target in each of the positions of the specific laser beam and to obtain reception information of the specific laser beam, and deduction by the calculator of the position of the target from reception information.

\* \* \* \* \*